June 26, 1956  L. C. MILLER  2,751,965
TUBE SEALER

Filed Oct. 2, 1953  4 Sheets-Sheet 3

INVENTOR.
LEONIDAS C. MILLER
BY
Lyon+Lyon
ATTORNEYS

INVENTOR.
LEONIDAS C. MILLER
BY
Lyon & Lyon
ATTORNEYS

United States Patent Office 2,751,965
Patented June 26, 1956

2,751,965
TUBE SEALER

Leonidas C. Miller, Los Angeles, Calif.

Application October 2, 1953, Serial No. 383,858

11 Claims. (Cl. 154—42)

This invention relates to apparatus for closing and sealing the open ends of plastic tubes such as, for example, tubes which contain shaving cream, tooth paste, etc. The tubes are commonly formed of vinyl chloride material, but this is by way of illustration only and many other plastic materials may be used in the composition of the tubes.

The principal object of this invention is to provide an improved form of apparatus for sealing plastic tubes and the like by means of high frequency electric energy.

Another object is to provide a device for sealing tubes in this manner which may be attached to existing tube filling apparatus without requiring extensive changes or alterations.

Another object is to provide a device of this type which operates automatically as the rotary head of the tube carrying device indexes from station to station.

A more detailed object is to provide an improved mechanism for opening and closing the tube sealing dies.

Another object is to provide means for energizing the high frequency electrical apparatus when the dies reach a location near fully closed position.

Another object is to provide a novel form of cooling one of the dies which is mounted on electrically insulating material.

Another object is to provide a novel form of electrical interlock which prevents delivery of high frequency electrical energy to the dies until they are in closed position with a plastic tube between them.

A related object is to provide an improved form of die having removable means for impressing indicia into the wall of the plastic tube adjacent the location of the closing seal.

Other and related objects and advantages will appear hereinafter.

In the drawings:

Figure 9 is a perspective view of one of the plastic tubes after sealing.

Figure 1:
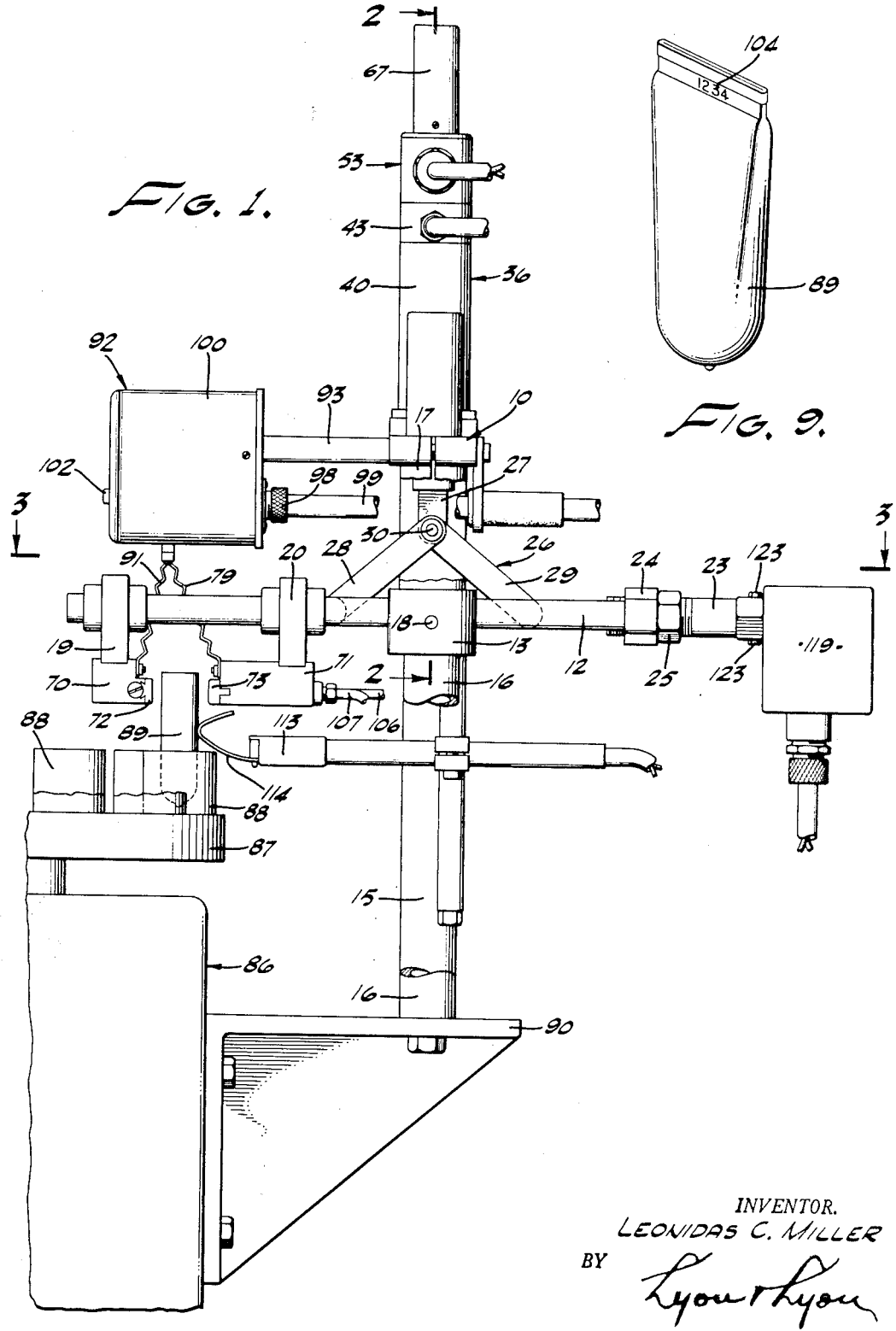
Figure 1 is a side elevation showing a preferred embodiment of my invention.

Referring to the drawings:

The frame generally designated 10 supports a pair of parallel horizontal guide bars 11 and 12 which are fixed to the base 13. Set screws 14 prevent movement of the guide bars relative to the base 13. Parallel upright bars 15 and 16 support the base 13 in position. The height of the base 13 may be adjusted by adjusting the position of the clamping sleeves 17 with respect to the upright bars 15 and 16. Set screws 18 serve to fix the clamping sleeves 17 with respect to the base 13.

A first die member generally designated 19 is mounted to slide on the parallel bars 11 and 12, and a second die member 20 is also mounted to slide on these bars. An actuating rod or tension element 21 is fixed to the die member 19 and extends horizontally between the guide bars 11 and 12. The actuating rod 21 passes through a guide opening 22 in the base 13 and extends into sleeve 23 in telescopic relation. The sleeve 23 is threaded into a cross bar 24 adjoining the rearward ends of the bars 11 and 12. A lock nut 25 holds the sleeve in adjusted position.

Figure 3:
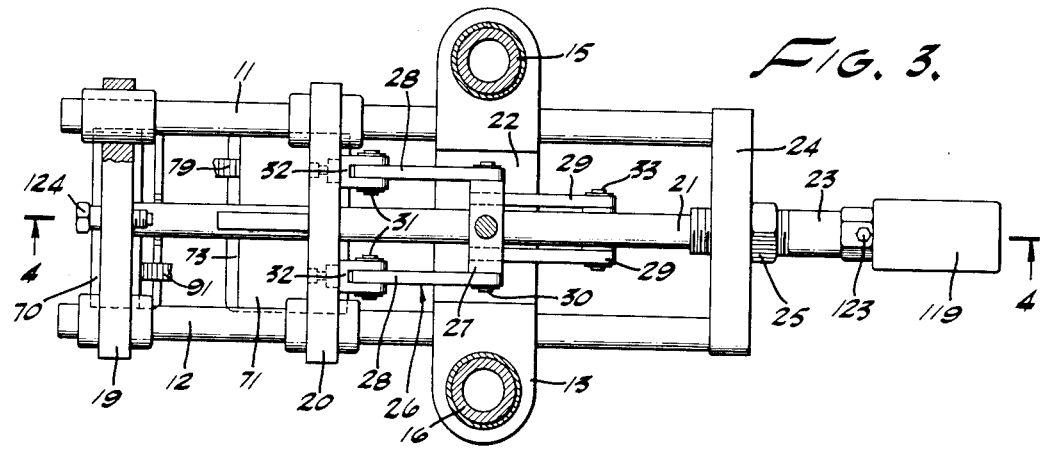
Figure 3 is a plan view partly broken away and taken substantially on the lines 3—3 as shown in Figure 1.
Figure 4:
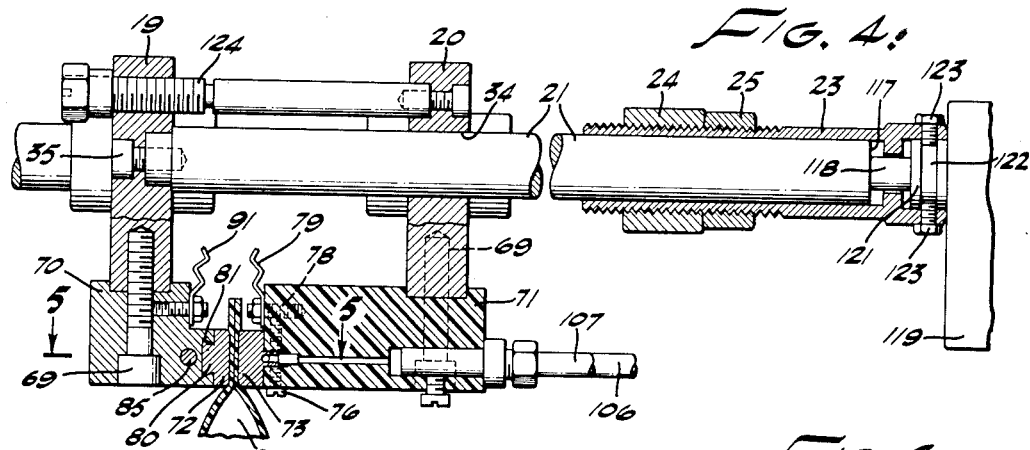
Figure 4 is a sectional elevation taken substantially on the lines 4—4 as shown in Figure 3.
Figure 5:
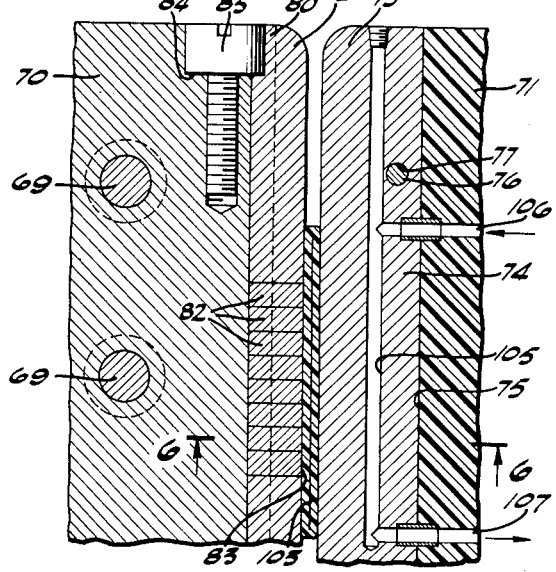
Figure 5 is a sectional plan view taken substantially on the lines 5—5 as shown in Figure 4.
Figure 6:
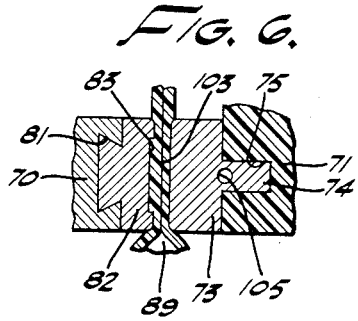
Figure 6 is a fragmentary detail taken substantially on the lines 6—6 as shown in Figure 5.
Figures 7, 8:
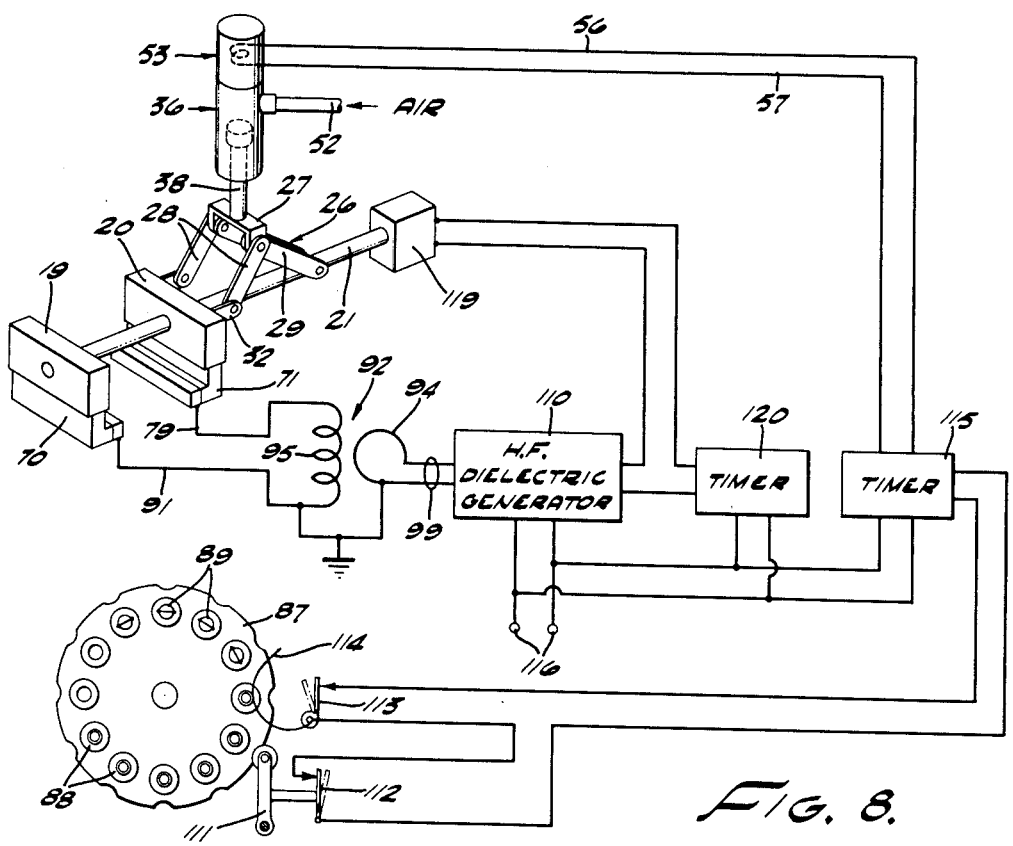
Figure 7 is an exploded view partly broken away showing construction of the high frequency matching transformer.
Figure 8 is a wiring diagram.

Means are provided for moving both of the die members toward and away from a central position and, as shown in the drawings, this means includes a toggle mechanism generally designated 26. This toggle mechanism includes a vertically reciprocable crosshead 27 which is pivotally connected to a first pair of links 28 and is also pivotally connected to a second pair of links 29. The pivotal connections are accomplished by means of the transverse aligned pivot pins 30. The outer ends of the links 28 extend in one direction and the outer ends of the links 29 extend in the other direction. The forward ends of the links 28 are connected to the die member 20 by means of pivot pins 31 and yokes 32. The rearward ends of the links 29 are connected by pivot pin 33 to the actuating rod 21. From this description it will be understood that downward movement of the crosshead 27 causes the diverging links 28 and 29 to spread, thereby moving the actuating rod 21 to the right and moving the die member 20 to the left, as viewed in Figure 3. The actuating rod 21 is mounted to slide within an opening 34 in the die member 20 and is fixed to the die member 19 by means of the threaded element 35. Accordingly, downward movement of the crosshead causes the die members 19 and 20 to move toward each other.

Figure 2:
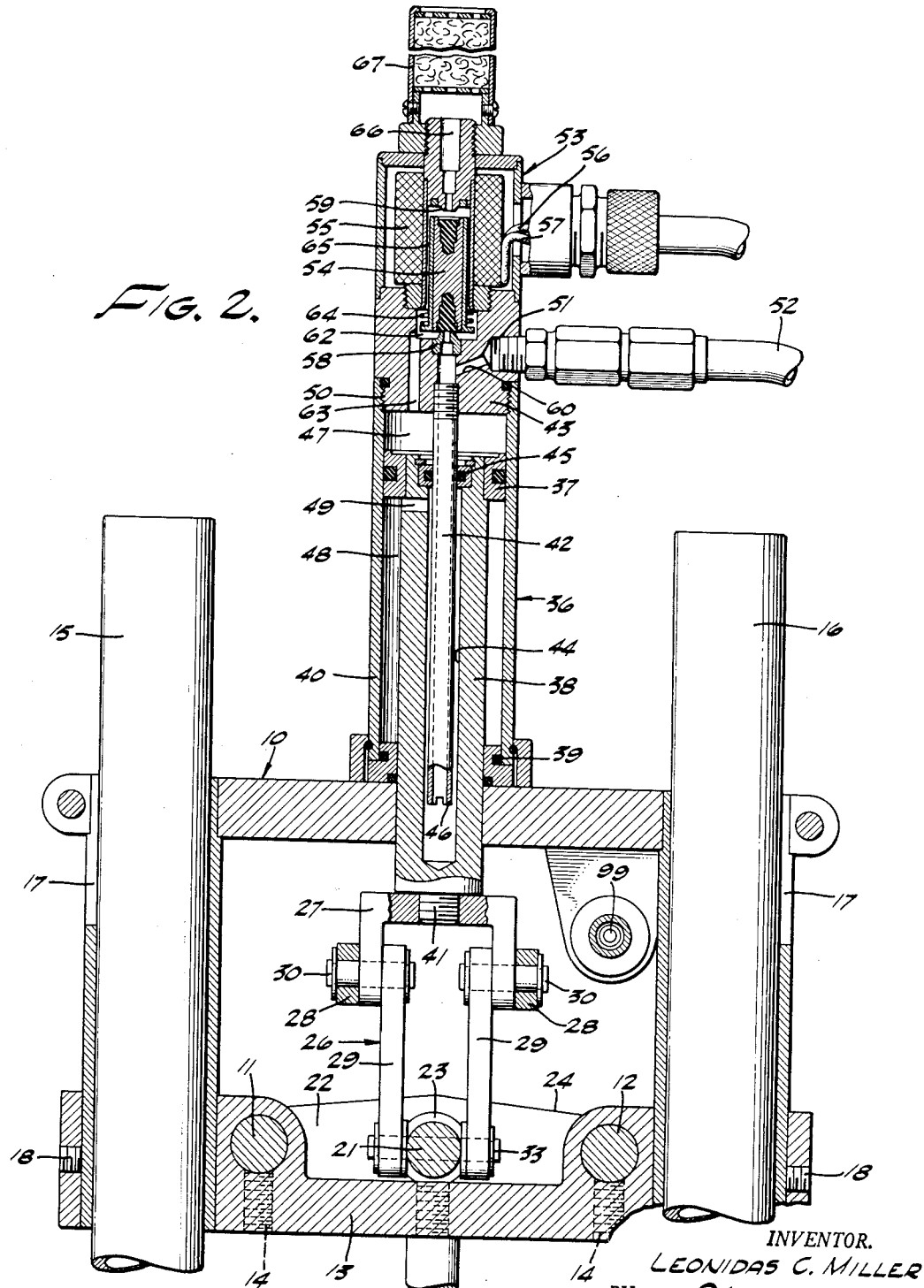
Figure 2 is a sectional elevation taken substantially on the lines 2—2 as shown in Figure 1.

Power means are provided for reciprocating the crosshead 27 and, as best shown in Figure 2, this power means includes a power cylinder assembly 36 having a piston 37 fixed on a hollow piston rod 38. Packing means 39 prevents leakage between the shell 40 and the outer surface of the piston rod 38. The lower end of the piston rod is fixed to the crosshead 27 by means of the threads 41.

A stationary spear tube 42 is fixed at its upper end to the body 43 and projects downward into the bore 44 within the piston rod 38. Seal means 45 carried by the piston engages the outer surface of the spear tube 42. The spear tube is open at its lower end 46. When pressure fluid is admitted into the chamber 47 above the piston, the piston moves downward and causes pressure fluid in the annular space 48 to escape through port 49, bore 44 and spear tube 42. When pressure is exhausted from the chamber 47 and admitted into the interior of the spear tube 42, the fluid pressure passes into bore 44 and through port 49 into the annular space 48, thereby raising the piston 37.

The body 43 is connected to the shell 40 by means of threads 50 and this body provides an inlet opening 51 for connection to a fluid pressure supply hose 52. The hose 52 is preferably connected to a suitable source of air under pressure.

Valve means are provided for alternately pressurizing and exhausting the chamber 47 and, as shown in the drawings, a solenoid valve assembly 53 operates to move a shuttle valve 54 which comprises the armature of a solenoid. The field windings of the solenoid are shown at 55. When electric current is supplied through the leads 56 and 57, the armature 54 is raised away from valve seat 58 and closes against the upper valve seat 59.

Air under pressure from hose 52 then passes through port 60 through valve seat 58 into cavity 62 and through passageway 63 into the chamber 47. The chamber 47 and annular space 48 are both pressurized, but since the effective area of the upper side of the piston is greater than the effective area at the upper end of the annular space 48, the piston is overbalanced and moves downward. When the electric energy through leads 56 and 57 is cut off, the armature 54 falls by gravity, assisted by spring 64, thereby opening valve seat 59 and closing valve seat 58. Air pressure is still admitted through annular space 48 via spear tube 42, but the air pressure in the chamber 47 is now vented through passageway 63, cavity 62, annular space 65, valve seat 59 and passageway 66. A muffler assembly 67 may be provided to reduce noise of exhaust air escaping through passageway 66.

Each of the die members 19 and 20 includes a die carrier 70, 71 and each of the die carriers supports a metal die 72, 73. Threaded elements 69 support each die carrier on its respective die member. The die carrier 71 is formed of electrically insulating material. The metal die 73 has a horizontal tongue portion 74 which extends into a groove 75 provided in the front face of the die carrier 71. Threaded elements 76 extend through aligned apertures 77 in the tongue 74 and carrier 71 to hold the die 73 in position against displacement. One of the threaded elements 76 contacts a horizontal screw 78 which serves as a terminal for the electrical lead wire 79. High frequency electrical energy supplied through this lead wire passes through the horizontal screw 78, the vertical threaded elements 76, into the tongue 74 of the metal die 73.

The metal die 72 is provided with a dovetail portion 80 which is received within the dovetail slot 81 provided on the metallic carrier 70. The metal die 72 may include a plurality of removable segments 82 which are also carried in the dovetail groove 81. These segments 82 have front faces 83 which may carry indicia for impressing into the material of the plastic tubes. The various parts of the metal die 72 including the segments 82 are confined in position between abutments 84 provided by the projecting heads of threaded elements 85 mounted on the carrier 70.

A tube filling machine 86 of conventional design supports a rotary head 87 containing receptacles or pockets 88 for individual tubes 89. These tubes 89 are supported in the pockets 88 with their upper ends open. Means for filling the tubes is provided but not shown in the drawings. The rotary head 87 indexes from station to station to bring each tube into alignment with the filling apparatus. Each tube when filled then passes to the sealing station shown in the drawings. Means for turning the head 87 and indexing it are provided on the filling machine 86. The bracket 90 mounted on the machine 86 serves as a support for the lower ends of the upright bars 15 and 16. The die members 19 and 20 are positioned so that they are equally spaced on opposite sides of the tube 89 when it is indexed to sealing position. When the crosshead 27 is lowered to move the dies toward sealing position, the dies 72 and 73 first close the open end of the tube and then hold the side walls of the tube in closed position while high frequency electric energy is supplied to the dies by means of the electrical leads 79 and 91. The electrical lead 79 is connected to the die 73 as described above, and the electrical lead 91 is connected to the metallic die carrier 70.

The matching transformer 92 is mounted on the frame 10 by means of forwardly extending supports 93. This device 92 may comprise a single-turn primary winding 94 which encircles a multiple-turn secondary winding 95. The winding 95 is connected at one end to the terminal block 96 and electrical lead 91. The winding 95 is connected at the other end to the terminal block 97 and electrical lead 79. The electrical lead-in connections 96 for the primary turn 94 are supplied through terminal 98 and coaxial cable 99. The coaxial cable 99 carries the high frequency electrical energy from the dielectric generator 110. The matching transformer 92 then steps up the voltage beyond the capacity of the coaxial cable 99.

The internal parts of the device 92 are enclosed within a suitable housing 100. One wall of the housing may carry a single-turn inductive loop 101 adapted to excite an indicator lamp 102. Whenever high frequency electrical energy is passing through leads 79 and 91, the lamp 102 glows as an indicator.

The frequency of the current supplied to the dies 72 and 73 may be on the order of 50 megacycles, and causes the plastic material of the tube 89 to soften and melt somewhat and thereby form a seal along the joint 103 between the walls of the closed tube 89. Any numbers, letters or other indicia carried by the die segments 82 are impressed on the outer surface of the tube, as shown at 104 in Figure 9.

The metal die holder 70 is able to conduct heat away from the die 72 so that the latter does not overheat, but the die holder 71 formed of insulating material is a poor conductor of heat and hence the die 73 may become too hot for satisfactory operation. In order to cool this die 73, I provide a cavity 105 within it and circulate a coolant to and from this cavity. The coolant preferably comprises an electrically nonconducting liquid such as, for example, ethylene glycol. The coolant is supplied through tube 106 and passes out of the cavity 105 through the discharge tube 107. Suitable heat exchange apparatus (not shown) is provided so that the coolant can be recirculated through the cavity 105.

Electrical interlock means are provided which prevent closing of the dies or delivery of high frequency electric energy to the dies until the tube 89 is in proper position. As shown in the drawings, an indexing lever 111 is connected to effect closing of electric switch 112 whenever the rotary head 87 stops at one of the indexing positions. Another electric switch 113 is closed whenever the wire whisker 114 contacts one of the tubes 89 in the proper position for closing. The switches 112 and 113 are connected in series. When both switches are closed, the timer 115 energizes the lead wires 56 and 57 to cause the solenoid valve assembly to admit air pressure into the chamber 47, thereby moving the crosshead 27 downward and moving the die members 19 and 20 toward closed position. The timer 115 is supplied with power from the terminals 116.

When the dies 72 and 73 approach closed position, the end 117 of the actuating rod 21 engages the element 118 of the electric switch 119, thereby closing the switch and energizing the high frequency dielectric generator 110. The timer 120 interrupts the current flow through the switch 119 after a predetermined time interval. This time interval as adjusted to provide the proper amount of heat to produce a satisfactory seal along the joint 103 between the walls of the tube 89. The timer 120 and the dielectric generator 110 are both supplied with power from the terminals 116.

The switch 119 does not close until the dies 72 and 73 approach closed position, and therefore the possibility of injuring the operator by electric shock is substantially eliminated. The dies are so close together when the switch 119 closes that there is not enough room for the operator's fingers to be placed between the dies.

The sleeve 23 supports the housing of the switch 119 by means of the projection 121 and groove 122. The threaded elements 123 on the sleeve 23 project into the groove 122. The position of the rod end 117 can be adjusted with respect to the element 118 by turning the sleeve 23 on its threads relative to the cross bar 24. This adjustment provides the means of varying the time of delivering electric energy to the dies with respect to their distance from fully closed position. An adjustable stop 124 determines the final spacing of the dies 72 and 73 in closed position.

An additional safety feature resides in the provision of the switches 112 and 113 which prevent closing of the dies until a plastic tube is in proper position between them; thus inadvertent closing of the dies with possible injury to the operator is prevented.

Having fully described my invention, it is to be understood that I do not wish to be limited to the details herein set forth, but my invention is of the full scope of the appended claims.

I claim:

1. In a device of the class described, the combination of: a frame, first and second die members each slidably mounted on the frame for reciprocating movement toward and away from each other, a crosshead mounted for reciprocating movement on the frame in a direction at right angles to the direction of movement of said members, power means for reciprocating the crosshead, a toggle mechanism including a pair of diverging links each having one end pivotally connected to the crosshead, a tension element extending in the direction of movement of said members, means including pivot means connecting the other end of one of the links to one of said members and the other end of the other link to the tension element so that spreading of the latter said ends of the links is effective to move said members toward each other.

2. In a device of the class described, the combination of: a frame, first and second die members each slidably mounted on the frame for reciprocating movement toward and away from a central position, a crosshead mounted on the frame at one side of said central position for reciprocating movement in a direction at right angles to the direction of movement of said members, power means for reciprocating the crosshead, a toggle mechanism including a pair of diverging links each having one end pivotally connected to the crosshead, means including pivot means connecting the other end of one of the links to the nearer of said members, a tension element extending in the direction of movement of said members, and means including pivot means connecting the other end of the other link to said tension element, whereby spreading of the latter said ends of the links is effective to move said members toward each other.

3. In a device of the class described, the combination of: a frame, parallel guide means fixed on the frame, first and second die members slidably mounted on said guide means, an actuating rod secured to the first die member, a crosshead mounted for reciprocating movement on the frame in a direction at right angles to the direction of movement of said rod, power means for reciprocating the crosshead, a toggle mechanism including a pair of diverging links each having one end pivotally connected to the crosshead, means including pivot means connecting the other end of one of the links to the second said member and the other end of the other link to said rod so that spreading of the latter said ends of the links is effective to move said members toward each other.

4. In a device of the class described, the combination of: a frame, parallel guide means fixed on the frame, first and second die members slidably mounted on said guide means, an actuating rod secured to the first die member, a crosshead mounted for reciprocating movement on the frame in a direction at right angles to the direction of movement of said rod, power means for reciprocating the crosshead, a symmetrical toggle mechanism including a pair of diverging links each having one end pivotally connected to the crosshead, the toggle mechanism being located at one side of both of said members, means including pivot means connecting the other end of one of the links to the nearer of said members, and means including pivot means connecting the other end of the other link to said rod, whereby spreading of the latter said ends of the links is effective to move said members toward each other.

5. In a device of the class described, the combination of: a frame having parallel horizontal guide bars fixed thereon, first and second die members slidably mounted on said bars, an actuating rod secured to the first die member, a crosshead mounted for vertical reciprocating movement on the frame, power means for reciprocating the crosshead, means for supplying electric energy to said die members, a switch operated by movement of said rod for actuating said means, a toggle mechanism positioned between the second die member and said switch, said mechanism including a pair of links each having one end pivotally connected to the cross head, and means including pivot means connecting the other end of one of the links to the second die member and the other end of the other link to said rod, whereby spreading of the latter said ends of the links is effective to move said die members toward each other and supply electric energy to them.

6. In a device for closing and sealing the open ends of plastic tubes and the like, the combination of: a frame, a pair of members each slidably mounted on the frame for reciprocating movement toward and away from each other from a central closed position, power means for moving said members, each member having a die carrier thereon, a metal die on each carrier, the metal dies being adapted to clamp an open ended plastic tube therebetween, voltage increasing means adjacent the dies providing high frequency electrical energy to said dies for sealing the tube, and an electric switch remote from said dies operatively connected to energize the latter said means upon closing movement of the dies to a predetermined location adjacent said central position.

7. In a device for closing and sealing the open ends of the plastic tubes and the like, the combination of: a frame, a pair of parallel guide bars fixed on the frame, first and second die members slidably mounted on the bars, an actuator rod secured to the first die member, power means for moving said members toward and away from a central position, each member having a die carrier thereon, a metal die on each carrier, the metal dies being adapted to clamp an open ended plastic tube therebetween, voltage increasing means adjacent the dies providing high frequency electrical energy to said dies for sealing the tube, and an electric switch remote from said dies operatively connected to said rod to energize the latter said means upon closing movement of the dies to a predetermined location adjacent said central position.

8. In a device of the class described, the combination of: a frame, a pair of members each slidably mounted on the frame for reciprocating movement toward and away from each other, each member having a die carrier thereon, a metal die on each carrier, means adjacent the dies providing high frequency electrical energy to said dies for sealing the tube, one of the die carriers being formed of electrically insulating material, means for cooling the metal die on the latter said die carrier including a cavity within the latter said die, and means for circulating an electrically non-conducting coolant to and from said cavity.

9. In a device for closing and sealing the open ends of plastic tubes and the like, the combination of: a frame, a pair of members each slidably mounted on the frame for reciprocating movement toward and away from each other, each member having a die carrier thereon, a metal die on each carrier, the metal dies being adapted to clamp an open ended plastic tube therebetween, means adjacent the dies providing high frequency electrical energy to said dies for sealing the tube, one of the die carriers being formed of electrically insulating material, means for cooling the metal die on the latter said die carrier including a cavity within the latter said die, and means for circulating an electrically nonconducting coolant to and from said cavity.

10. In a device for closing and sealing the open ends of plastic tubes and the like, the combination of: a frame, a pair of members each slidably mounted on the frame for reciprocating movement toward and away from each other from a central closed position, power means for moving said members, each member having a die carrier thereon, a metal die on each carrier, the metal dies being adapted to clamp an open ended plastic tube therebetween, voltage increasing means adjacent the dies providing high frequency electrical energy to said dies for sealing the tube, an electric switch on the frame operatively connected to energize the last said means when the metal dies approach the central closed position, one of the die carriers being formed of electrically insulating material, means for cooling the metal die on the latter said die carrier including a cavity within the latter said die, and means for circulating an electrically non-conducting coolant to and from said cavity.

11. In combination with a tube filling machine having a rotary head provided with a plurality of tube receiving pockets and having means for turning and indexing the rotary head; a device for closing and sealing the open ends of the tubes, comprising: a frame, a pair of die members mounted on the frame for relative reciprocating movement toward and away from a central closed position, power means for effecting such relative movement, a first electric switch adapted to be actuated by indexing movement of the rotary head, a second electric switch having an actuator element adapted to be contacted by a tube in clamping position on said rotary head, the first and second switches being connected in series and adapted to actuate said power means, electrical means providing high frequency electrical energy to the die members for sealing a tube clamped therebetween, and a third electric switch operatively connected to energize said electrical means upon closing movement of the dies to a predetermined location adjacent said central position.

References Cited in the file of this patent

UNITED STATES PATENTS

| | | |
|---|---|---|
| 1,806,846 | Fox et al. | May 26, 1931 |
| 2,166,761 | Kohl | July 18, 1939 |
| 2,200,971 | Sonneborn et al. | May 14, 1940 |
| 2,336,962 | Salfisberg | Dec. 14, 1943 |
| 2,401,991 | Walton et al. | June 11, 1946 |
| 2,406,714 | Strickland | Aug. 27, 1946 |
| 2,460,460 | Langer | Feb. 1, 1949 |
| 2,647,557 | Selvin | Aug. 4, 1953 |
| 2,653,646 | Swartz | Sept. 29, 1953 |
| 2,691,474 | Olson | Oct. 12, 1954 |